US008243455B1

(12) United States Patent  
Raymond et al.

(10) Patent No.: US 8,243,455 B1  
(45) Date of Patent: Aug. 14, 2012

(54) DOCKING PORTABLE COMPUTERS FOR STORAGE AND CHARGING

(75) Inventors: Jerome E. Raymond, Glen Ridge, NJ (US); Michael F. Cuttitta, Saddle Brook, NJ (US); Benson H. Kravtin, Brooklyn, NY (US)

(73) Assignee: Datamation Systems, Inc., South Hackensack, NJ (US)

( * ) Notice: Subject to any disclaimer, the term of this patent is extended or adjusted under 35 U.S.C. 154(b) by 296 days.

(21) Appl. No.: 12/764,552

(22) Filed: Apr. 21, 2010

(51) Int. Cl.  
*H05K 5/00* (2006.01)  
*H05K 7/00* (2006.01)

(52) U.S. Cl. ............... 361/727; 361/679.4; 361/679.41; 361/679.43; 361/724; 361/725; 361/726

(58) Field of Classification Search ............... 361/679.4, 361/679.41, 679.43, 724, 725, 726, 727  
See application file for complete search history.

(56) References Cited

U.S. PATENT DOCUMENTS

| 6,008,621 | A * | 12/1999 | Madison et al. | 320/107 |
| 6,218,796 | B1 * | 4/2001 | Kozlowski | 318/280 |
| 7,130,190 | B1 | 10/2006 | Baker | |
| 7,160,113 | B2 * | 1/2007 | McConnell et al. | 434/365 |
| 7,325,891 | B1 * | 2/2008 | Kinsley et al. | 312/257.1 |
| 7,595,995 | B2 * | 9/2009 | Hock | 361/727 |
| 2003/0141687 | A1 | 7/2003 | Wixted et al. | |
| 2004/0139571 | A1 | 7/2004 | Chang et al. | |
| 2009/0016008 | A1 * | 1/2009 | Hock | 361/683 |

* cited by examiner

*Primary Examiner* — Anthony Haughton  
(74) *Attorney, Agent, or Firm* — Arthur Jacob

(57) ABSTRACT

A repository in the form of a cart, and a method for docking a plurality of portable computers in storage within the cart, are disclosed. The cart has an opening at the top of the cart and each computer is placed within a docking bay, connected electrically to an electrical connector at the docking bay. Each docking bay has an entrance at an upper level and a support member for the computer at a lower level located at a predetermined vertical distance from the upper level. The orientation of the docking bays, and the predetermined vertical distance are such that upon movement of a computer toward a fully seated position within a docking bay, the computer is biased by gravity toward and into retention in the fully seated position and is maintained by gravity assistance in such retention during transport and storage in the cart, connected to the electrical connector at the docking bay. In a preferred construction, the support member is in the form of a tray placed in the cart above a lower compartment beneath the tray. The tray is mounted for pivotal movement between a first position wherein the tray is in place for supporting the computers above the lower compartment, and a second position wherein the tray is displaced to open access to the lower compartment from the opening at the top of the cart.

15 Claims, 6 Drawing Sheets

DOCKING PORTABLE COMPUTERS FOR STORAGE AND CHARGING

The present invention relates generally to the docking and storage of portable computers and pertains, more specifically, to facilitating the placement of portable computers into a repository for effective storage and charging, as well as the selective removal and distribution for use of such portable computers, with increased ease and convenience.

The proliferation of portable computers in recent years has led to widespread use of such computers in a variety of settings where individuals each are provided with a computer for use during a particular session. For example, it has become commonplace to provide each student in a classroom with a portable computer for use during a classroom session. Between sessions, these portable computers must be stored securely and, while in storage, the batteries which power the computers must be re-charged for subsequent use. As a result, a number of different storage units has been developed for accomplishing the storage and charging of portable computers between sessions of use, some of the more popular of these units being in the form of storage carts which facilitate movement of the stored computers between secure storage areas and the venues where the computers are distributed for use.

The wide variety of portable computers now made available for use in so many different venues, coupled with variations in the care exercised by the different users encountered at these venues in removing a computer from a particular unit and then replacing the computer for proper storage and charging, has presented problems in providing a system capable of accommodating all of these variables in a simple, practical, and economical fashion.

The present invention provides a repository and a method adapted readily to accommodate, with increased effectiveness and greater ease and economy, the storage and charging of any of a variety of available portable computers, and the placement in use of such computers in different venues. As such, the present invention attains several objects and advantages, some of which are summarized as follows: Provides a repository within which portable computers are placed for storage and charging with increased ease of placement and greater assurance that appropriate electrical connections are made and will be maintained throughout the storage period; facilitates the insertion and withdrawal of a portable computer into and out of a repository so as to encourage proper handling by a wide cross-section of different users; readily accommodates any one of many available portable computers without requiring extensive modification to adjust to a particular computer configuration; allows ready access to different areas of a repository for portable computers to enable a convenient location of components of particular portable computer systems, without the necessity for a complex construction; provides an arrangement of structural elements in a repository for portable computers which enables a greater capacity in a more compact storage and charging facility; assures that portable computers are placed in storage with appropriate electrical connections maintained during a full period of storage; provides a portable computer storage and charging repository in the for La of a cart moved readily into any one of a variety of venues for increased ease of use by many different users; assures that portable computers transported and stored in such a cart are connected to appropriate electrical connectors and are maintained connected during transport between a storage facility and a selected venue, as well as during a full period of storage; accomplishes an increased capacity for the storage and transport of portable computers within a more compact cart; provides a highly versatile repository of rugged construction for reliable long-term service in storing, charging, and distributing charged portable computers.

The above objects and advantages, as well as further objects and advantages, are attained by the present invention which may be described briefly as a repository for docking a plurality of portable computers in storage within the repository, with each computer placed at a docking location and connected electrically to at least one electrical connector at the docking location, each computer including an electrical connector element for connection to a docking electrical connector element of a corresponding electrical connector along a predetermined coupling direction, the repository comprising: a plurality of docking bays, each docking bay being placed at a docking location and having an entrance at an upper level and a depth extending from the upper level to a lower level located at a predetermined vertical distance from the upper level; a support member at each docking bay for supporting a computer within the docking bay with the computer extending upwardly from the lower level toward the upper level; an alignment member at each docking bay for engaging the computer to align the computer with the predetermined coupling direction upon lowering the computer through the entrance and into the depth of the docking bay to place the computer in a fully seated position within the docking bay, such that a corresponding electrical connector element will be coupled with and electrically connected to the docking electrical connector element of a corresponding electrical connector upon placement of the computer into the fully seated position; and a retention member at each docking bay for engaging the computer, when supported upon the support member, to retain the computer aligned with the predetermined coupling direction while the computer is in the fully seated position; the predetermined vertical distance between the upper level and the lower level being such that upon movement of each computer toward a respective fully seated position within a corresponding docking bay, each computer will be biased by gravity toward and into retention in the fully seated position and will be maintained by gravity assistance in such retention during storage, with each corresponding electrical connector element coupled with and electrically connected to the docking connector element of a corresponding electrical connector.

In addition, the present invention includes a method for docking a plurality of computers in storage within a repository, with each computer placed at a docking location and connected electrically to at least one electrical connector at the docking location, each computer including an electrical connector element for connection to a docking electrical connector element of a corresponding electrical connector along a predetermined coupling direction, the method comprising: providing a plurality of docking bays, and placing each docking bay at a corresponding docking location, with each docking bay having an entrance at an upper level and a depth extending from the upper level to a lower level placed at a predetermined vertical distance from the upper level; supporting a computer within each docking bay upon a support member at each docking bay, with the computer extending upwardly from the lower level toward the upper level; engaging and aligning each computer upon lowering the computer through the entrance and into the depth of the docking bay to place the computer in a fully seated position within the docking bay, supported upon the support member, with the corresponding electrical connector element coupled with and electrically connected to the docking electrical connector element of the corresponding electrical connector; and further engaging each computer with a retention member upon placement of the computer in the fully seated position to retain the computer aligned with the predetermined coupling direction while the computer is in the fully seated position; the predetermined distance placed between the upper level and the lower level being such that upon movement of each computer toward a respective fully seated position within a corresponding docking bay, each computer is biased by gravity toward and into retention in the fully seated position and is maintained by gravity assistance in such retention during storage, with each corresponding electrical connector element coupled with and electrically connected to the docking connector element of a corresponding electrical connector.

The invention will be understood more fully, while still further objects and advantages will become apparent, in the following detailed description of preferred embodiments of the invention illustrated in the accompanying drawing, in which.

Figure 1:
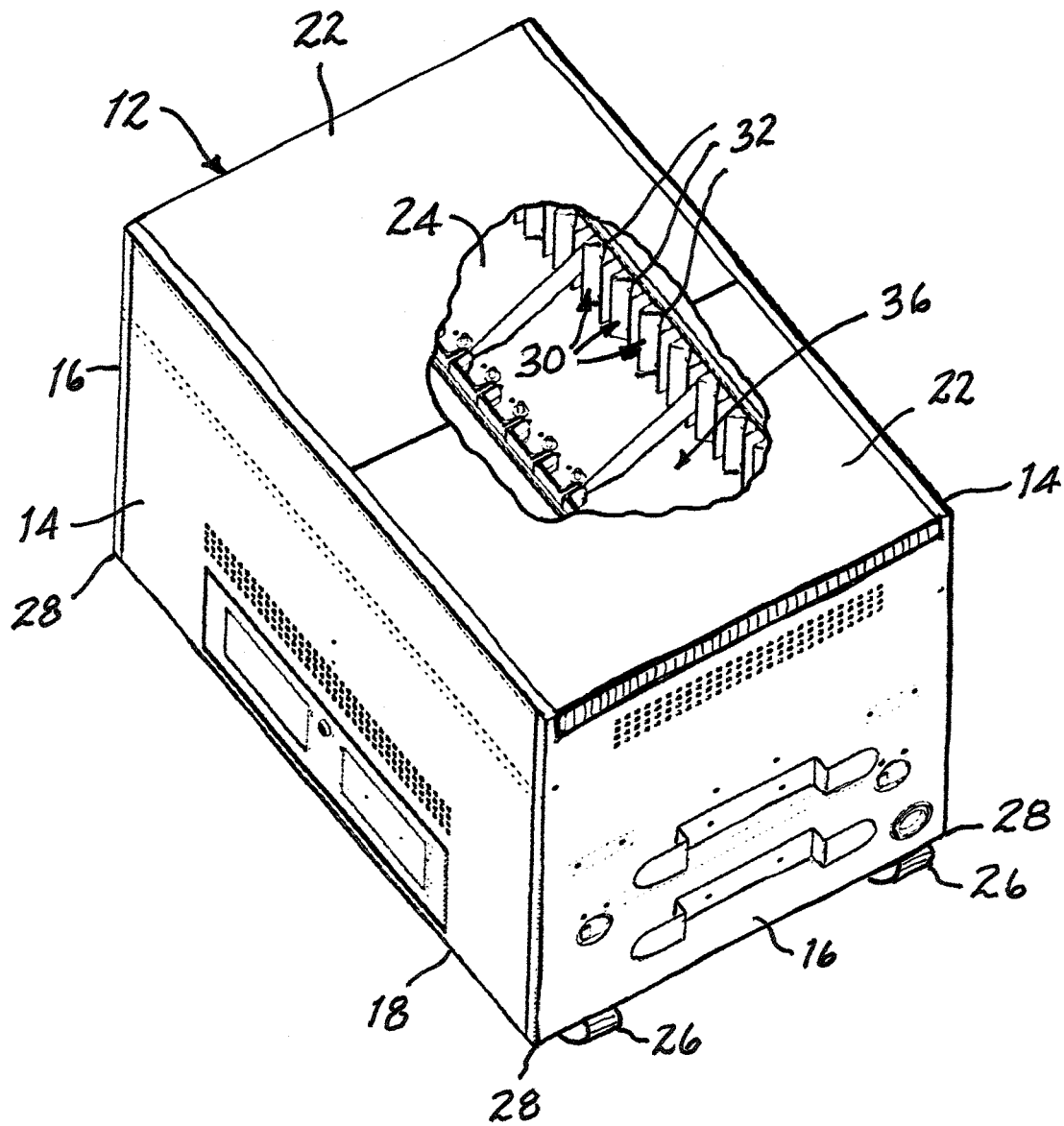
FIG. 1 is a top, end and side pictorial view of a portable computer repository in the form of a cart constructed in accordance with the present invention.
Figure 2:
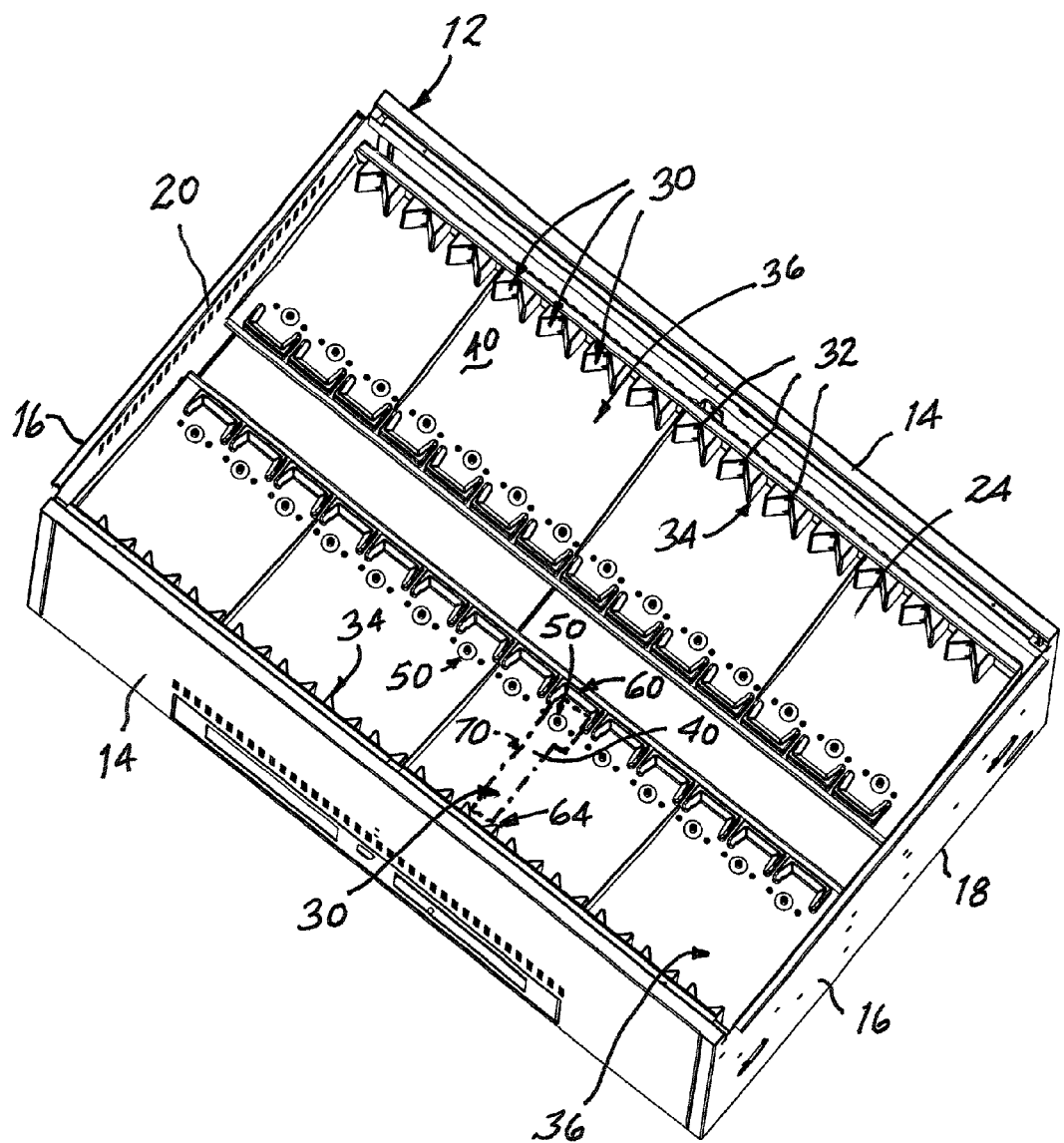
FIG. 2 is another top, end and side pictorial view of the cart, with some component parts deleted, and showing some interior details of construction.
Figure 3:
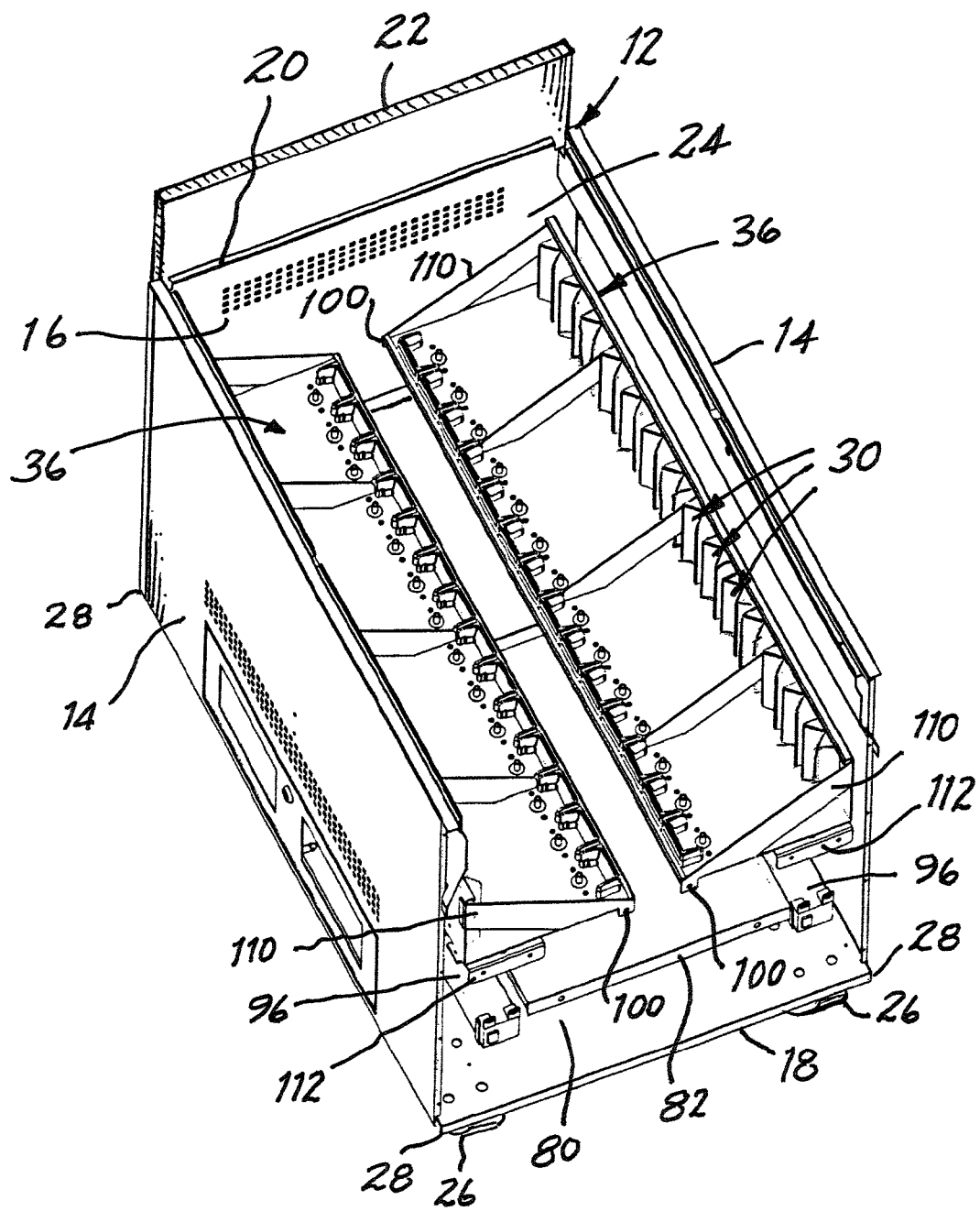
FIG. 3 is a top, end and side pictorial view of the cart, with a near cover member and a near end wall deleted to show further internal details of construction.

Referring now to the drawing, and especially to FIGS. 1 through 4 thereof, a repository for portable computers is illustrated as a cabinet, shown in the preferred form of a cart 12 having a generally parallelepiped configuration and comprised of laterally opposite side walls 14 and longitudinally opposite end walls 16, the side walls 14 and the end walls 16 extending upwardly, in a substantially vertical direction, from a bottom wall 18 to a top opening 20. Cover members 22 are selectively movable between a closed position, wherein the cover members 22 are placed over the opening 20 to close the interior 24 of the cart 12, as depicted in FIG. 1, and an open position, wherein the cover members 22 are moved into juxtaposition with respective end walls 16 to open opening 20 and enable full access to interior 24 through opening 20, as illustrated in FIG. 2. Wheels 26 are mounted adjacent corners 28 of the bottom wall 18, beneath the bottom wall 18, as is conventional in such carts.

A plurality of docking bays 30 are made available within the interior 24 of cart 12, each docking bay 30 being located at a respective docking location 32. In the illustrated embodiment, the docking bays 30 are arranged in two parallel rows 34 extending longitudinally along two respective trays 36 which are arranged in side-by-side juxtaposition along a longitudinal direction. Trays 36 provide each docking bay 30 with a base 40, and each docking bay 30 extends in a substantially vertical direction downwardly from an entrance 42, located at an upper level LU, to the base 40, located at a lower level LL, placed at a predetermined vertical distance D from the upper level LU, such that each docking bay 30 has a prescribed depth extending between the entrance 42 and the base 40 of each docking bay 30, all as best seen in FIG. 4.

An electrical connector is affixed to the base 40 of each docking bay 30 and is shown in the form of a pass-through jack 50 which extends through the base 40 to establish a docking electrical connector element in the form of an upper pin 52 extending into a corresponding docking bay 30 along a pin axis P, and a further electrical connector element in the form of a lower socket 54 extending below the corresponding docking bay 30, with the upper pin 52 and the lower socket 54 electrically connected to one-another. Each docking bay 30 includes an alignment member in the form of a bracket 60 affixed to the tray 36 along an inner edge 62 of the docking bay 30, and a retention member in the form of a channel 64 affixed to the tray 36 along an outer edge 66 of the docking bay 30, such that the respective brackets 60 and channels 64 are spaced apart laterally to establish lateral boundaries of each docking bay 30.

Figure 4:
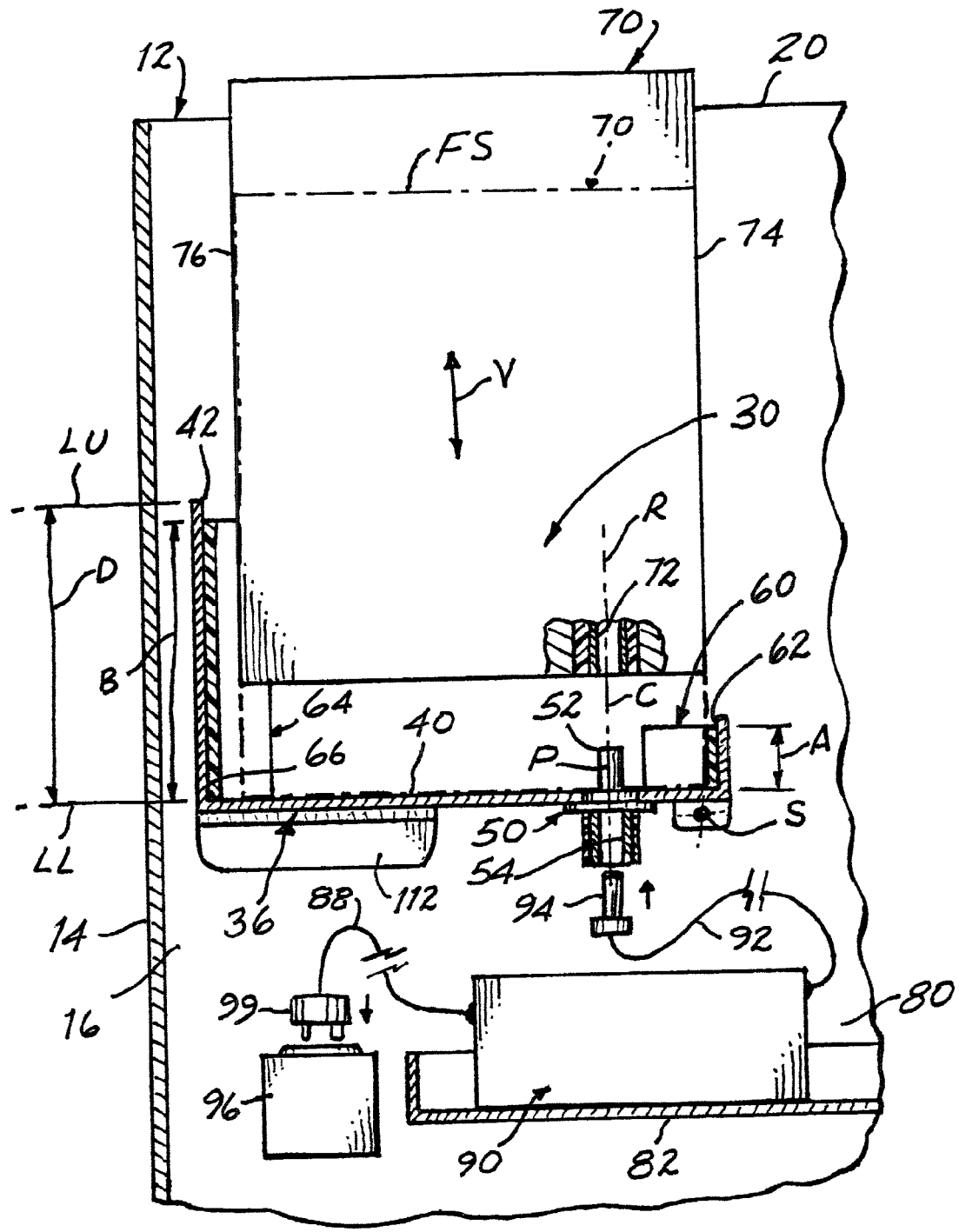
FIG. 4 is a very much enlarged, fragmentary, essentially diagrammatic lateral cross-sectional view illustrating the manner in which a portable computer is inserted into and placed within the cart.

As best seen in FIG. 4, each docking bay 30 receives a portable computer, shown somewhat diagrammatically at 70, by lowering the computer 70 through opening 20 to proceed through entrance 42 and into the depth of the docking bay 30 until the computer 70 is fully seated upon the base 40, as depicted in phantom at FS in FIG. 4. As is conventional in portable computers, computer 70 includes an electrical connector element in the form of a receptacle 72 which is connected electrically to the battery (not shown) of the computer 70, and which extends along a receptacle axis R. Upon insertion of the computer 70 into a docking bay 30, the receptacle axis R is aligned with the pin axis P, along a predetermined coupling direction C so that once the computer 70 is fully seated within the docking bay 30, the pin 52 is engaged with the receptacle 72 to complete an electrical connection between the receptacle 72 and the lower socket 54 of jack 50. Bracket 60 has a generally U-shaped cross-sectional configuration tailored specifically to engage the particular configuration of computer 70, along a first side edge 74 of the computer 70, and assure that as the computer 70 is moved downwardly into the docking bay 30, the receptacle axis R is aligned with the coupling direction C so that the pin 52 of jack 50 is aligned with the receptacle 72 for effecting the aforesaid electrical connection. The channel 64 has a V-shaped cross-sectional configuration so that, at the same time, channel 64 engages the computer 70 along a second side edge 76, opposite first side edge 74, to retain the computer 70 aligned along the coupling direction C. The brackets 60 and the channels 64 each have an altitudinal length extending between the entrance 42 of a corresponding docking bay 30 and the base 40 of that docking bay 30. In the preferred construction, the altitudinal length A of each bracket 60 is substantially less than the altitudinal length B of each channel 64 so that a computer 70 retained between a bracket 60 and a channel 64 is held in place with a minimal constraint, thereby facilitating selective removal of the computer 70 from the docking bay 30. That same construction which provides a minimal constraint, also facilitates insertion of a computer 70 into a docking bay 30 by simplifying access to a docking bay 30.

Each tray 36 is spaced away from the bottom wall 18 of the cart 12 and is raised within the cart 12 to place each docking bay 30 within easy reach from the opening 20 and thereby facilitate the insertion and withdrawal of computers 70, through opening 20, as described above. In addition, the raised location of trays 36 establishes a lower compartment 80 beneath each tray 36, and a shelf 82 is located within lower compartment 80, the shelf 82 extending longitudinally between the end walls 16, beneath each tray 36, with the shelf 82 affixed to the end walls 16. A component which serves as a battery charger is shown at 90, and is constructed specifically for charging the battery of computer 70. Battery charger 90 is placed on the shelf 82 and is connected electrically to the lower socket 54 of the jack 50 by means of an electrical cable 92 having an electrical plug 94 which engages the lower socket 54. A power strip 96 is secured within the lower compartment 80, alongside a corresponding side of shelf 82, for supplying power to the battery charger 90, via electrical cord 98 and plug 99 of the battery charger 90, each power strip 96 itself being powered by an external source of power (not shown) in a now conventional manner. Jack 50 is constructed so that the pin 52 mimics the plug 94, while the lower socket 54 mimics the receptacle 72 of computer 70, enabling the simple measure of utilizing the battery charger 90, which is specific to computer 70, for charging the computer 70 while the computer 70 is docked and stored within docking bay 30.

The orientation of each docking bay 30, along substantially vertical directions V, together with the predetermined vertical distance D between the upper level LU and the lower level LL is such that upon movement of a computer 70 toward the fully seated position within a docking bay 30, the computer 70 will be biased by gravity toward and into retention at the fully seated position FS. Moreover, the computer 70 will be maintained by gravity in such retention during storage, with the electrical connection between the computer 70 and the battery charger 90 maintained intact throughout the full period of storage. Further, the biasing force of gravity will assure that the computer 70 remains seated properly within docking bay 30, with the electrical connection between the computer 70 and the battery charger 90 intact, resisting disconnection during movement of the cart 12 to transport the computers 70 stored within the cart 12 to and from the venue where the computers 70 are distributed for placement into use. Thus, the arrangement wherein the computers 70 are inserted into the cart 12, and withdrawn from the cart 12, in the substantially vertical directions V through the opening 20 at the top of the cart 12 provides not only convenience, but utilizes the biasing force of gravity to assist in seating and in maintaining each computer 70 in place, appropriately connected for re-charging. In addition, the substantially vertical orientation of computers 70 enables an increased capacity for multiple computers in a compact cart, with every computer being accessible readily for easy selective withdrawal and replacement.

Cart 12 is adapted readily to accommodate any one of a variety of portable computers currently made available. Thus, jacks 50 can be replaced readily so that the electrical connector elements provided by jack 50 will match those found in a particular selected computer and in the battery charger ordinarily furnished with that computer. In addition, the brackets 60 can be replaced easily with brackets having a configuration complementary to that of a selected computer. Channels 64 are more versatile in that the V-shaped cross-sectional configuration will accommodate dimensions found in many different computers; however, channels 64 also can be removed and replaced, with ease, if necessary. Both the brackets 60 and the channels 64 preferably are fabricated of a synthetic polymeric material, the preferred material being ABS. The preferred material for the body of jack 50 is nylon. Hence, cart 12 is adapted simply and economically to accommodate any of a wide variety of current portable computers.

Figure 5:
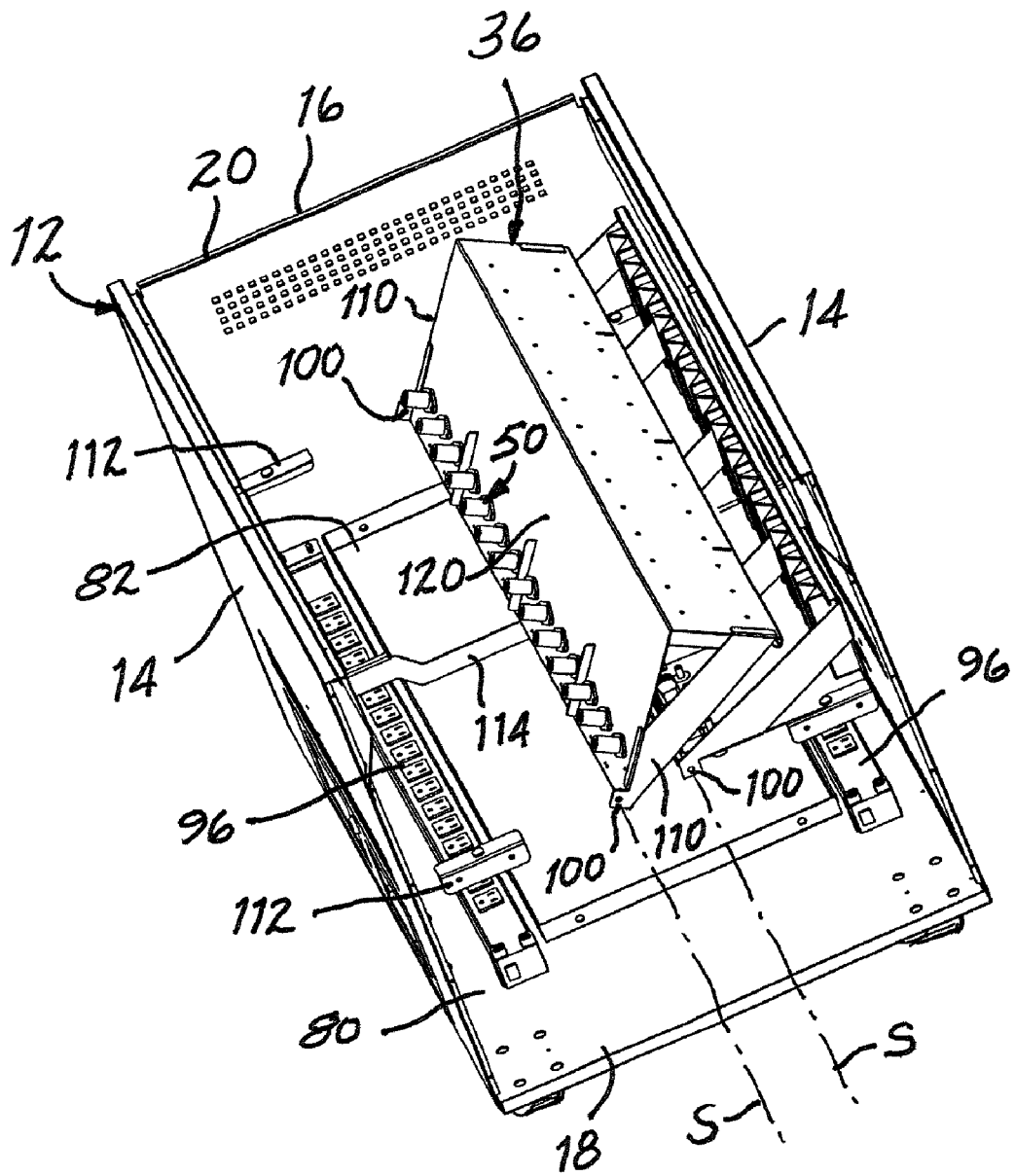
FIG. 5 is a top, end and side pictorial view of the cart with the cover members and the near end wall deleted, and with component parts of the cart in another operating position.
Figure 6:
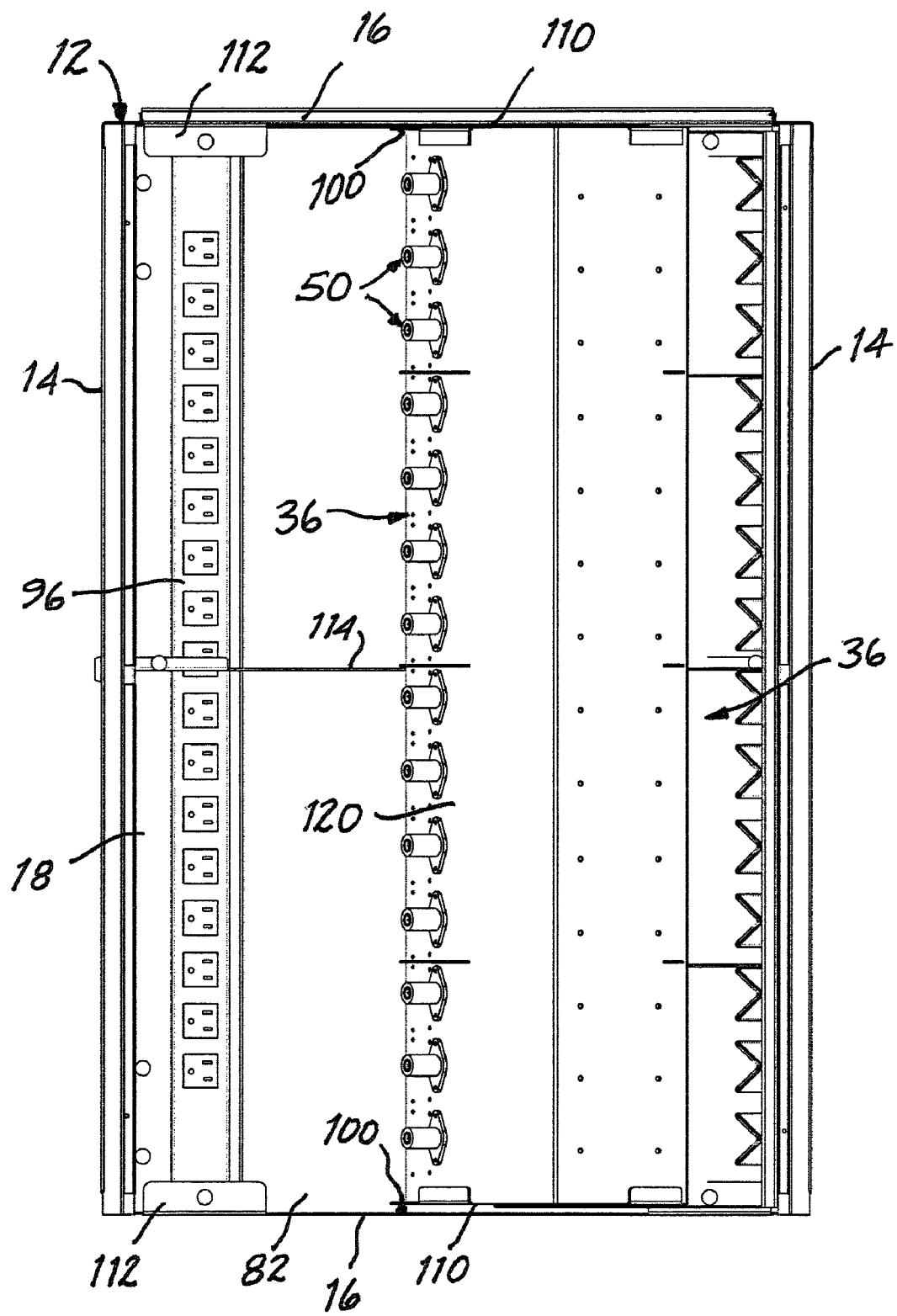
FIG. 6 is a top plan view of the cart with the cover members deleted and component parts of the cart in the position shown in FIG. 5.

Turning now to FIGS. 5 and 6, as well as with reference to FIGS. 1 through 4, in order to facilitate setting up the cart 12 to receive computers 70, as described above, the two trays 36 each are mounted for pivotal movement about a corresponding longitudinal axis of rotation S. A pivotal connection 100 at each end 110 of each tray 36 mounts each tray 36 between opposite end walls 16 for selective pivotal movement between a first position, as seen in FIGS. 1 through 4, wherein a tray 36 is located and oriented for supporting a computer 70 in each docking bay 30, and a second position, as illustrated in FIGS. 5 and 6, wherein a tray 36 is displaced away from the first position to open access to the lower compartment 80, from the opening 20. In this manner, access to the lower compartment 80 is gained from the top of the cart 12, facilitating the placement and connection of battery charger 90 without requiring any dismantling and removal of component parts of the cart 12. Moreover, the construction is simple and economical, requiring a minimal number of structural members and no elaborate hardware, while preserving the structural integrity of the cart 12 itself.

When in the first position, each tray 36 merely rests upon cleats 112 which are affixed to the end walls 16, and upon a central brace 114 affixed to and extending laterally between the side walls 14. When a tray 36 is in the second position, the jacks 50 carried by the tray 36 are fully exposed for facilitating connection of battery chargers 90 to corresponding jacks 50, and a power strip 96 is fully exposed for facilitating connections between the exposed power strip 96 and battery chargers 90 located on shelf 82. In addition, the shelf 82 is exposed for ease of placement of each battery charger 90 associated with a computer 70 placed in a corresponding docking bay 30. Further, the lower compartment 80 and the underside 120 of the tray 36 are exposed for ease of maintenance or repair. Still further, replacement of jacks 50, brackets 60 and channels 64 in order to adapt cart 12 to different portable computers, as set forth above, is accomplished easily, and without disturbing the structural integrity of the cart 12.

The provision of the easily accessed lower compartment 80 makes available a convenient space within the cart 12 for the placement of further selected components (not shown) which can be connected to computers 70, such as external data storage components and the like. In addition to the provision of a jack 50 at each docking bay 30, other connectors, such as an ETHERNET connector or the like, can be made available for connection to a computer while stored in a docking bay, with any required ancillary components placed in the lower compartment 80.

It will be seen that the present invention attains all of the objects and advantages summarized above, namely: Provides a repository within which portable computers are placed for storage and charging with increased ease of placement and greater assurance that appropriate electrical connections are made and will be maintained throughout the storage period; facilitates the insertion and removal of a portable computer into and out of a repository so as to encourage proper handling by a wide cross-section of different users; readily accommodates any one of many available portable computers without requiring extensive modification to adjust to a particular computer configuration; allows ready access to different areas of a repository for portable computers to enable a convenient location of components of particular portable computer systems, without the necessity for a complex construction; provides an arrangement of structural elements in a repository for portable computers which enables a greater capacity in a more compact storage and charging facility; assures that portable computers are placed in storage with appropriate electrical connections maintained during a full period of storage; provides a portable computer storage and charging repository in the form of a cart moved readily into any one of a variety of venues for increased ease of use by many different users; assures that portable computers transported and stored in such a cart are connected to appropriate electrical connectors and are maintained connected during transport between a storage facility and a selected venue, as well as during a full period of storage; accomplishes an increased capacity for the storage and transport of portable computers within a more compact cart; provides a highly versatile repository of rugged construction for reliable long-term service in storing, charging, and distributing charged portable computers.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A repository for docking a plurality of portable computers in storage within the repository, with each computer placed at a docking location and connected electrically to at least one electrical connector at the docking location, each computer including an electrical connector element for connection to a docking electrical connector element of a corresponding electrical connector along a predetermined coupling direction, the repository comprising:
   a plurality of docking bays, each docking bay being placed at a docking location and having an entrance at an upper level and a depth extending from the upper level to a lower level located at a predetermined vertical distance from the upper level;
   a support member at each docking bay for supporting a computer within the docking bay with the computer extending upwardly from the lower level toward the upper level;
   an alignment member at each docking bay for engaging the computer to align the computer with the predetermined coupling direction upon lowering the computer through the entrance and into the depth of the docking bay to place the computer in a fully seated position within the docking bay, such that a corresponding electrical connector element will be coupled with and electrically connected to the docking electrical connector element of a corresponding electrical connector upon placement of the computer into the fully seated position; and
   a retention member at each docking bay for engaging the computer, when supported upon the support member, to retain the computer aligned with the predetermined coupling direction while the computer is in the fully seated position;
   the predetermined vertical distance between the upper level and the lower level being such that upon movement of each computer toward a respective fully seated position within a corresponding docking bay, each computer will be biased by gravity toward and into retention in the fully seated position and will be maintained by gravity assistance in such retention during storage, with each corresponding electrical connector element coupled with and electrically connected to the docking connector element of a corresponding electrical connector.

2. The repository of claim 1 wherein:
   the repository comprises a cabinet having laterally opposite side walls and longitudinally opposite end walls extending generally vertically from an opening adjacent the upper level to a bottom wall adjacent the lower level; and
   the support member comprises a tray extending longitudinally between the opposite end walls.

3. The repository of claim 2 wherein the cabinet comprises a cart having wheels mounted beneath the bottom wall of the cabinet.

4. The repository of claim 2 wherein:
   the tray is spaced upwardly from the bottom wall to establish a lower compartment within the cabinet below the tray; and
   each electrical connector is mounted upon the tray, aligned with the predetermined coupling direction, for connection with a selected electrical component placed within the lower compartment.

5. The repository of claim 4 wherein the electrical connector includes a further connector element communicating with the lower compartment for selective connection to the selected electrical component, the further connector element being electrically connected to the docking connector element.

6. The repository of claim 5 wherein the tray is mounted for selective movement between a first position, wherein the tray is located for supporting a computer in a corresponding docking bay above the lower compartment, and a second position, wherein the tray is displaced from the first position to open access to the lower compartment from the opening adjacent the upper level.

7. The repository of claim 6 wherein the tray is mounted for selective pivotal movement about a pivotal axis extending longitudinally between the opposite end walls of the cabinet to effect movement between the first and second positions.

8. The repository of claim 7 wherein the cabinet comprises a cart having wheels mounted beneath the bottom wall of the cabinet.

9. The repository of claim 2 wherein:
   each retention member comprises an elongate channel having an altitudinal length extending along a corresponding docking bay from adjacent the entrance of the corresponding docking bay to adjacent the tray; and
   each alignment member comprises a bracket located adjacent the tray and having an altitudinal length extending along a corresponding docking bay upwardly from adjacent the tray, each bracket being spaced laterally from a corresponding retention member to constrain a computer between the retention member and the alignment member, when the computer is in the fully seated position within a respective docking bay.

10. The repository of claim 9 wherein each alignment member has an altitudinal length substantially less than the altitudinal length of each retention member for maintaining a minimal constraint against removal of a computer from a corresponding docking bay to enable effective capture of a computer within a docking bay while facilitating selective removal of the computer from the docking bay in a direction from the lower level toward the upper level.

11. The repository of claim 10 wherein the cabinet comprises a cart having wheels mounted beneath the bottom wall of the cabinet.

12. A method for docking a plurality of computers in storage within a repository, with each computer placed at a docking location and connected electrically to at least one electrical connector at the docking location, each computer including an electrical connector element for connection to a docking electrical connector element of a corresponding electrical connector along a predetermined coupling direction, the method comprising:
   providing a plurality of docking bays, and placing each docking bay at a corresponding docking location, with each docking bay having an entrance at an upper level and a depth extending from the upper level to a lower level placed at a predetermined vertical distance from the upper level;

supporting a computer within each docking bay upon a support member at each docking bay, with the computer extending upwardly from the lower level toward the upper level;

engaging and aligning each computer upon lowering the computer through the entrance and into the depth of the docking bay to place the computer in a fully seated position within the docking bay, supported upon the support member, with the corresponding electrical connector element coupled with and electrically connected to the docking electrical connector element of the corresponding electrical connector; and further engaging each computer with a retention member upon placement of the computer in the fully seated position to retain the computer aligned with the predetermined coupling direction while the computer is in the fully seated position;

the predetermined distance placed between the upper level and the lower level being such that upon movement of each computer toward a respective fully seated position within a corresponding docking bay, each computer is biased by gravity toward and into retention in the fully seated position and is maintained by gravity assistance in such retention during storage, with each corresponding electrical connector element coupled with and electrically connected to the docking connector element of a corresponding electrical connector.

13. The method of claim 12 wherein the support member comprises a tray, and the method includes:

providing a lower compartment beneath the tray for selected electrical components for connection to corresponding electrical connectors; and moving the tray between a first position, wherein the tray is located for supporting a computer in a corresponding docking bay above the lower compartment, and a second position, wherein the tray is displaced from the first position to open access to the lower compartment from the opening adjacent the upper level.

14. The method of claim 13 wherein the tray is moved between the first and second positions by pivoting the tray about a pivotal axis.

15. The method of claim 13 wherein the tray moved between the first and second positions by pivoting the tray about a pivotal axis extending longitudinally along the repository.

* * * * *